(12) United States Patent
Cheng

(10) Patent No.: US 6,507,974 B1
(45) Date of Patent: Jan. 21, 2003

(54) DUST COLLECTOR

(75) Inventor: Mao-Nan Cheng, Fengyuan (TW)

(73) Assignee: San Ford Machinery Co., Ltd., Taichung Hsein (TW)

( * ) Notice: Subject to any disclaimer, the term of this patent is extended or adjusted under 35 U.S.C. 154(b) by 0 days.

(21) Appl. No.: 10/062,072

(22) Filed: Jan. 31, 2002

(51) Int. Cl.[7] .............................................. B01D 46/00
(52) U.S. Cl. ............................ 15/347; 15/352; 55/366; 55/429
(58) Field of Search ..................... 15/347, 352; 55/374, 55/366, 429

(56) References Cited

U.S. PATENT DOCUMENTS

| | | | | |
|---|---|---|---|---|
| 3,910,781 A | * | 10/1975 | Bryant, Jr. | .................. 15/314 |
| 4,715,872 A | * | 12/1987 | Snyder | ........................ 15/347 |
| 5,226,938 A | * | 7/1993 | Bailey et al. | .................. 55/305 |
| 6,221,135 B1 | * | 4/2001 | Wirth et al. | .................. 55/356 |

* cited by examiner

Primary Examiner—Chris K. Moore
(74) Attorney, Agent, or Firm—Akin, Gump, Strauss, Hauer & Feld, L.L.P.

(57) ABSTRACT

A dust collector includes a main frame, a suction device, a hollow support member, upper and lower dust collecting bags, and a plurality of clamping plates. The suction device includes a housing formed with an inlet and outlet, and a blade unit for drawing and discharging dust-laden air into and from the housing via the inlet and outlet, respectively. Each clamping plate includes a mounting segment secured on an outer wall surface of the support member, a clamping segment that cooperates with the outer wall surface of the support member so as to clamp a mouth portion of the lower dust collecting bag therebetween, and a guide segment that guides the mouth portion of the lower dust collecting bag for insertion between the clamping segment and the support member.

1 Claim, 5 Drawing Sheets

DUST COLLECTOR

BACKGROUND OF THE INVENTION

1. Field of the Invention

The invention relates to a dust collector, more particularly to a dust collector having a dust collecting bag that is easy to install.

2. Description of the Related Art

Referring to FIGS. 1 and 2, a conventional dust collector is shown to comprise a main frame 1, a suction device 2, an annular support member 3, and upper and lower dust collecting bags 4, 5. The main frame 1 has a bottom portion mounted with a plurality of rollers 101, and two upright support legs 102 connected to the bottom portion for supporting the suction device 2. The suction device 2 includes a housing 202 mounted on the main frame 1, and a motor-driven blade unit 201 mounted on the housing 202. The housing 202 is formed with a suction inlet 204 and a suction outlet 205. The support member 3 has an inner wall surface 303 that confines an air passage 305, and is coupled to the suction outlet 205 so as to communicate fluidly the air passage 305 with the suction outlet 205. The support member 3 further has upper and lower end parts 301, 302. The dust collecting bags 4, 5 are made of an air permeable fabric material, and have mouth portions provided with strap units 6, 7. The mouth portions of the dust collecting bags 4, 5 are sleeved on the outer wall surface 304 of the support member 3 at a respective one of the upper and lower end parts 301, 302. The strap units 6, 7 can be tightened so as to secure the dust collecting bags 4, 5 on the support member 3.

In use, after activating the blade unit 201, dust-laden air is drawn into the housing 202 via the suction inlet 204, and is discharged from the housing 202 via the suction outlet 205. The dust-laden air then enters into the dust collecting bags 4, 5 via the air passage 305 of the support member 3. After using the dust collector for a period of time, the bags 4, 5 are disassembled for cleaning the same so as to maintain good dust collecting effect of the bags 4, 5. Usually, the upper bag 4 is shaken so that the dust collected therein will be transferred to the lower bag 5. Thereafter, the lower bag 5 is removed from the support member 3 by loosening the strap unit 7 for cleaning. However, it is not possible for a single person to mount the lower bag 5 back on the support member 3 because, aside from the relatively large size of the bag 5, the lower bag 5 cannot be held against the support member 3 before the strap unit 7 is tightened. Thus, the help of another person is needed to secure the lower bag 5 on the support member 3, thereby arising in inconvenience.

SUMMARY OF THE INVENTION

Therefore, the main object of the present invention is to provide a dust collector having a dust collecting bag that is easy to install and that can be handled by only one person.

According to this invention, a dust collector comprises a main frame, a suction device, a hollow support member, a dust collecting bag, and a plurality of elongate resilient clamping plates. The suction device includes a housing and a motor-driven blade unit. The housing is mounted on the main frame and is formed with a suction inlet and a suction outlet. The motor-driven blade unit is mounted on the housing and is operable so as to draw dust-laden air into the housing via the suction inlet and so as to discharge the dust-laden air from the housing via the suction outlet. The hollow support member has looped outer and inner wall surfaces. The inner wall surface confines an air passage. The support member is coupled to the suction outlet so as to communicate fluidly the air passage with the suction outlet. The dust collecting bag has a mouth portion to be sleeved on the support member such that the mouth portion surrounds the outer wall surface of the support member and such that an interior of the dust collecting bag is in fluid communication with the air passage in the support member. The mouth portion is provided with a strap unit that is operable so as to tighten the mouth portion on the support member and so as to loosen the mouth portion from the support member. The elongate resilient clamping plates are mounted spacedly on the outer wall surface of the support member. Each of the clamping plates includes a mounting segment, a clamping segment, and a guide segment. The mounting segment is mounted securely on the outer wall surface of the support member. The clamping segment extends from the mounting segment, and cooperates with the outer wall surface of the support member so as to clamp the mouth portion of the dust collecting bag therebetween, thereby enabling retention of the mouth portion on the support member when the strap unit is in a loosened state. The guide segment extends inclinedly from the clamping segment in a radial outward direction relative to the support member, and guides the mouth portion of the dust collecting bag for insertion between the clamping segment and the outer wall surface of the support member.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
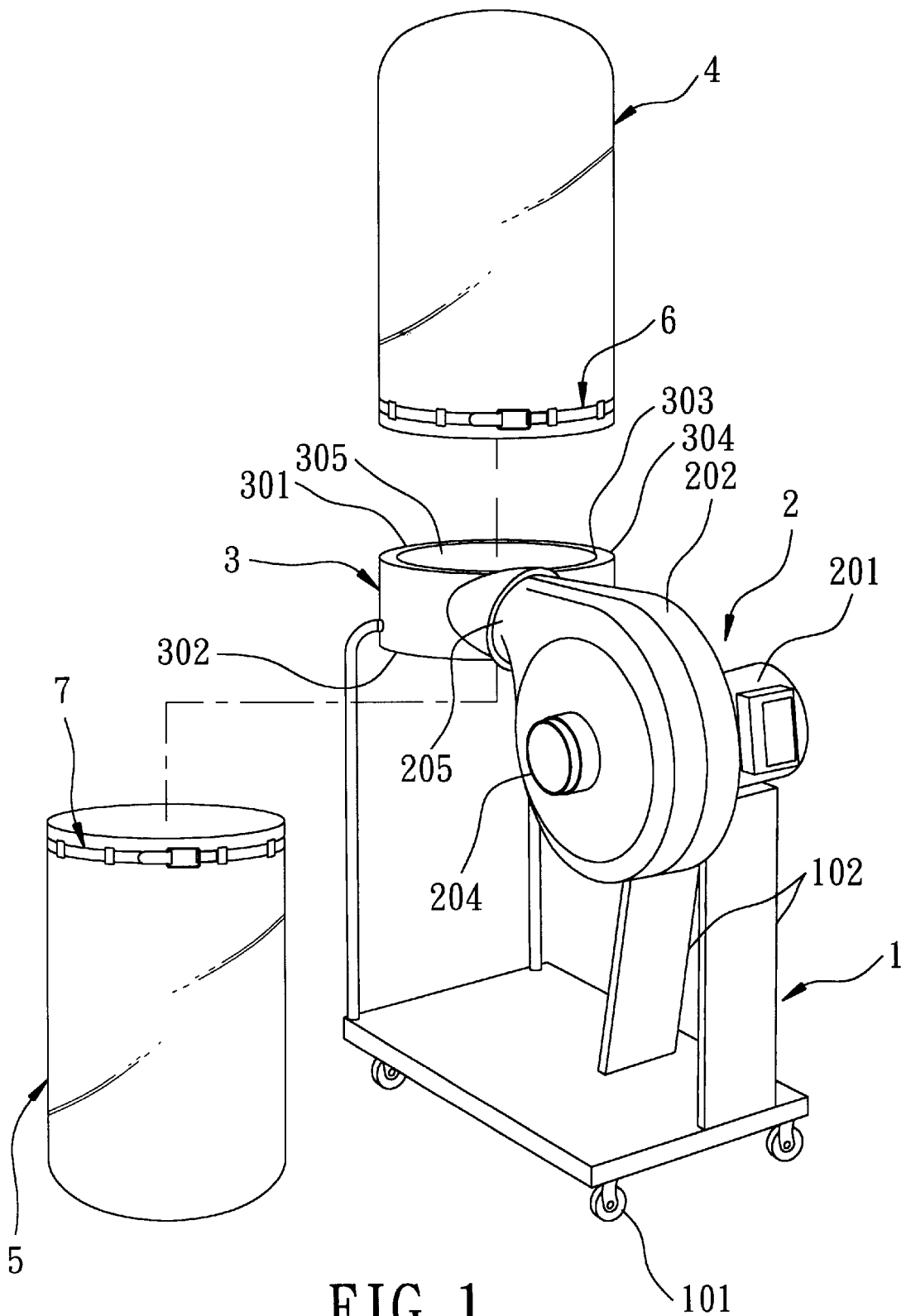
FIG. 1 is an exploded perspective view of a conventional dust collector.
Figure 2:
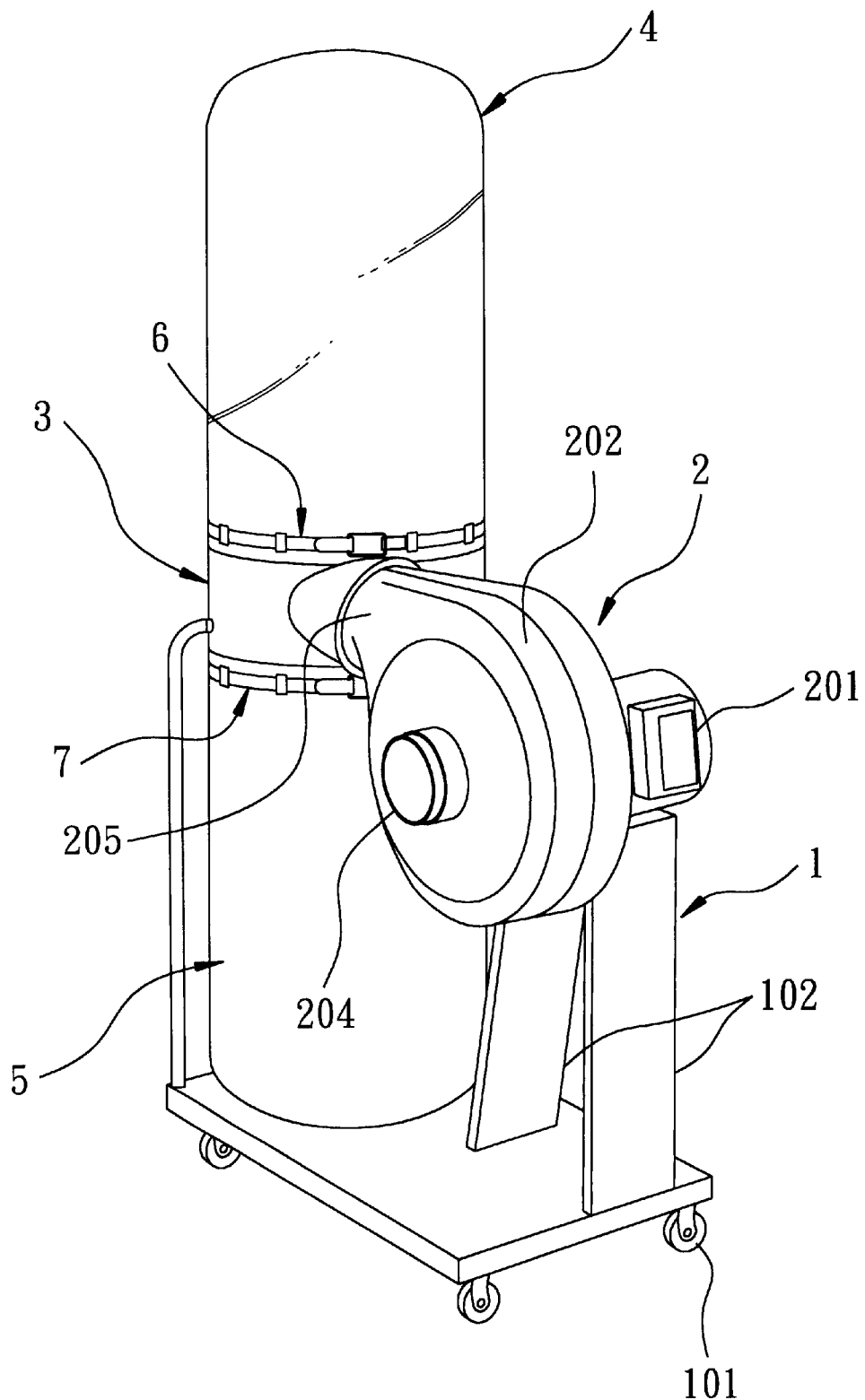
FIG. 2 is an assembled perspective view of the conventional dust collector.
Figure 3:
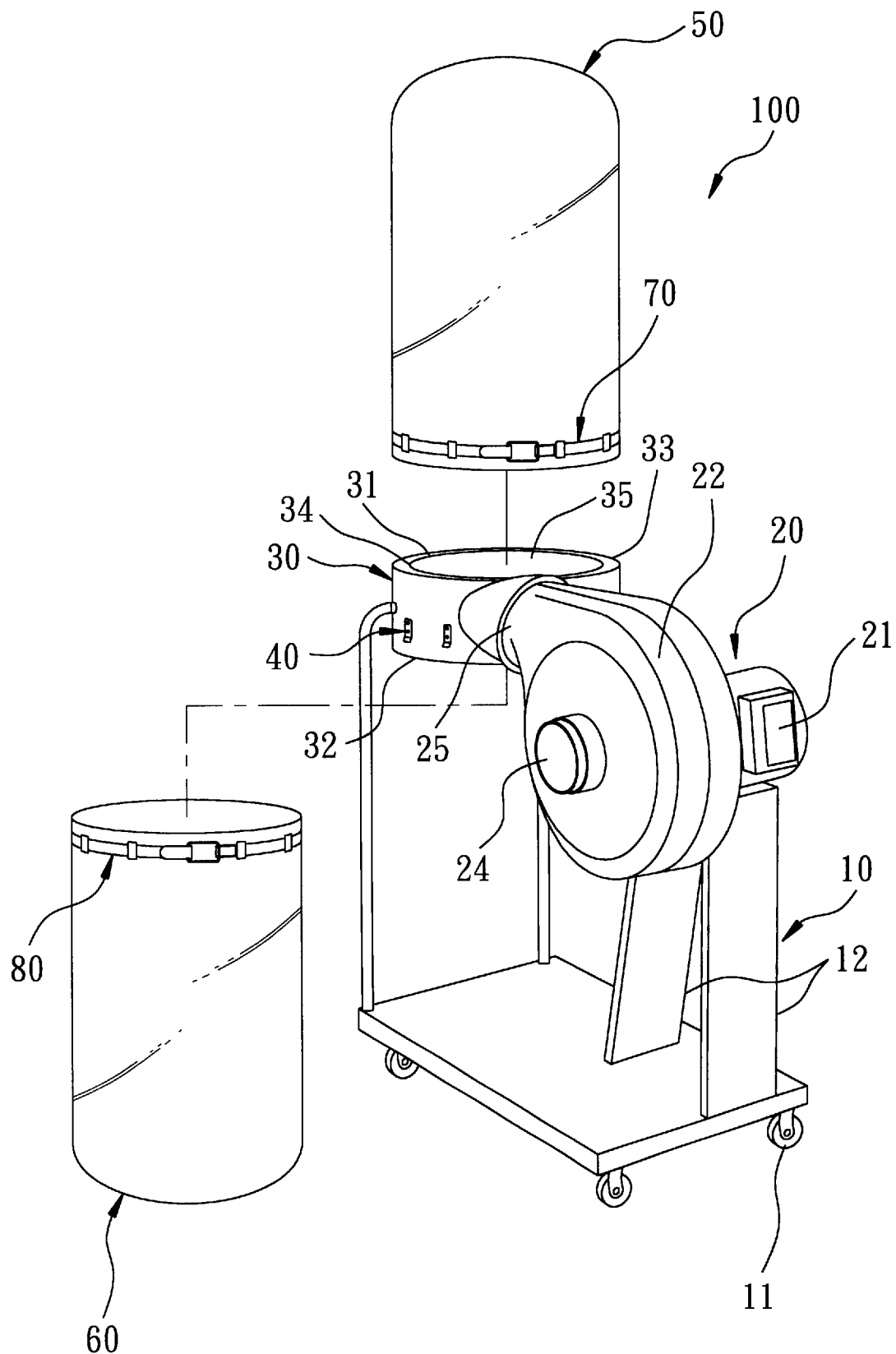
FIG. 3 is an exploded perspective view of the preferred embodiment of a dust collector according to the present invention.
Figure 4:
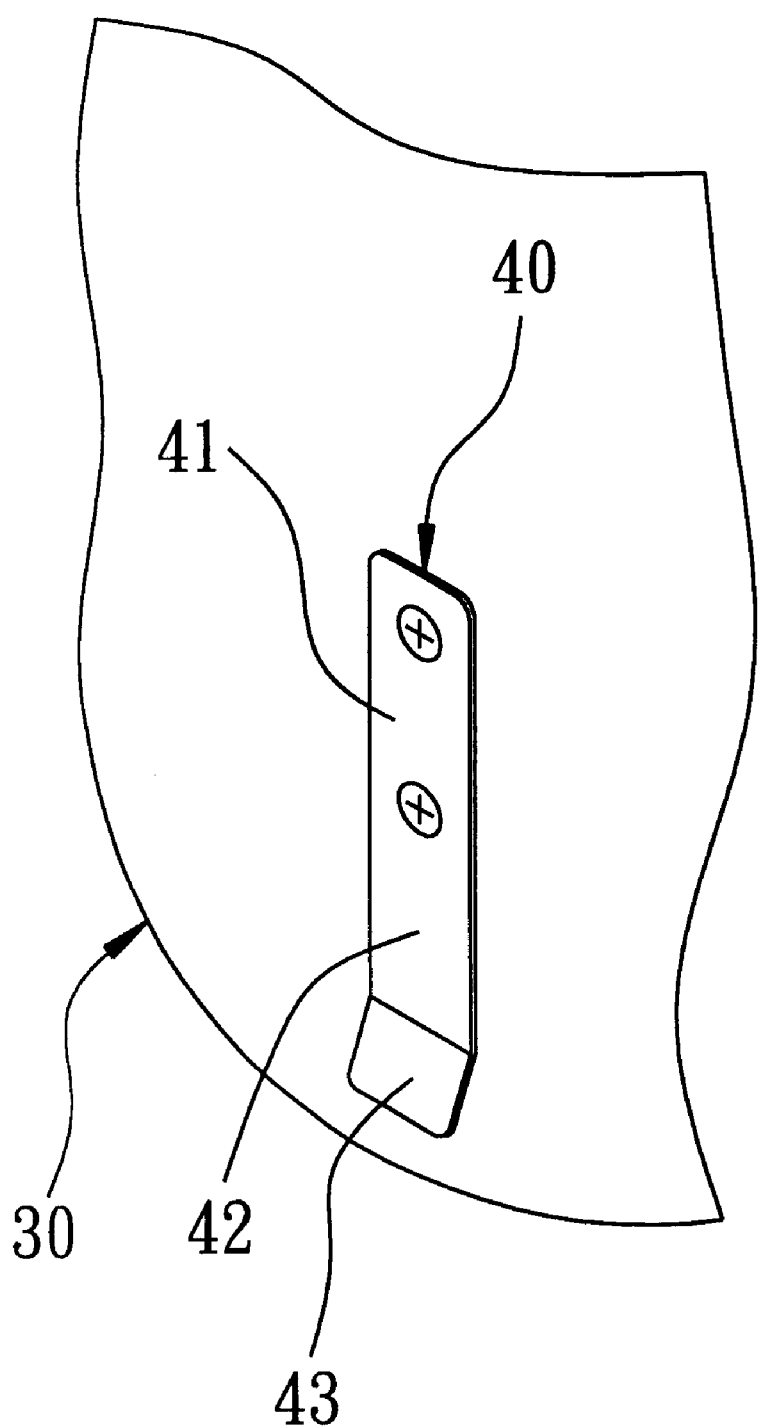
FIG. 4 is an enlarged fragmentary perspective view illustrating an elongate resilient clamping plate of the preferred embodiment.
Figure 5:
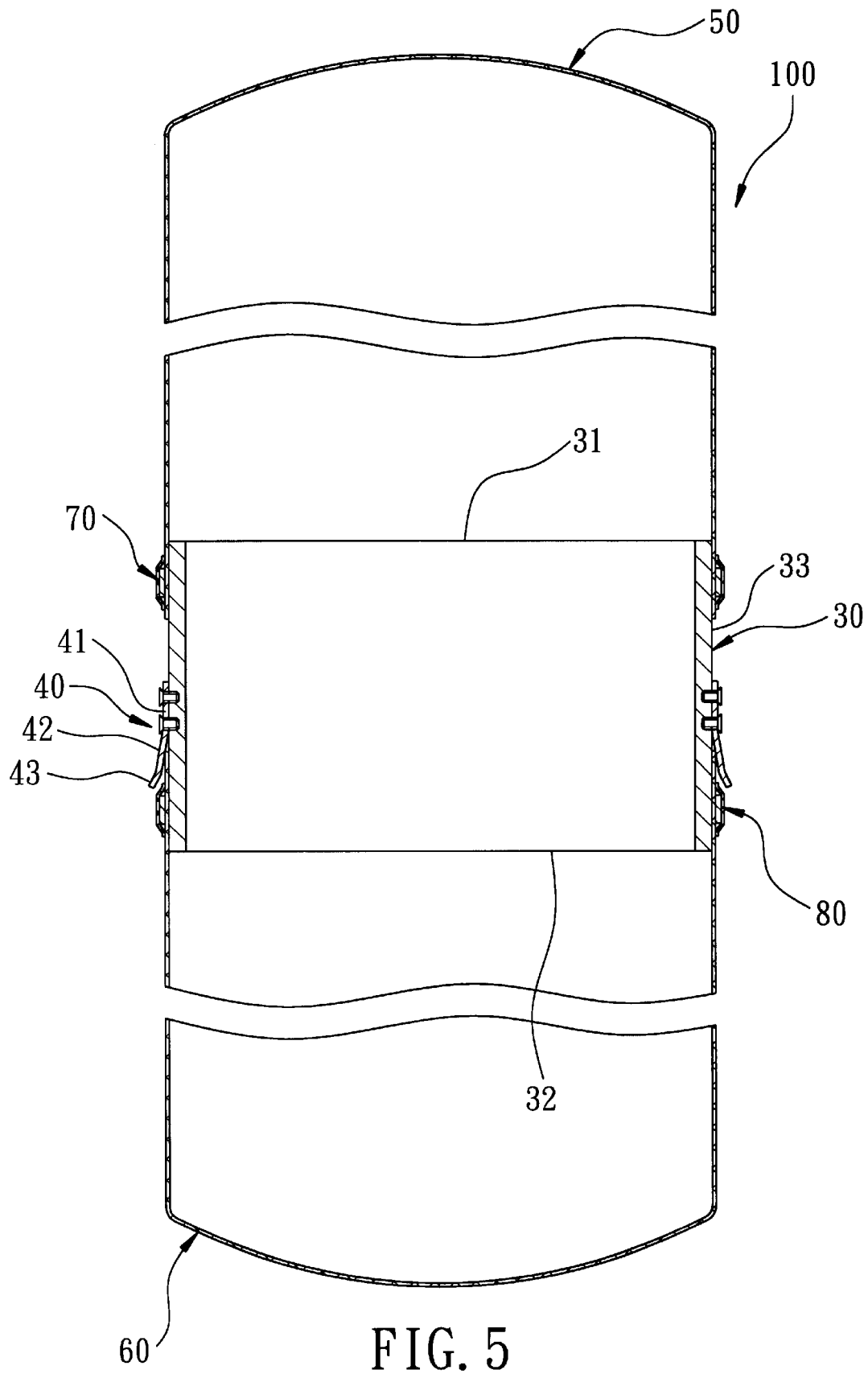
FIG. 5 is a fragmentary assembled schematic sectional view of the preferred embodiment of the present invention.

Referring to FIGS. 3 to 5, the preferred embodiment of a dust collector 100 according to the present invention is shown to comprise a main frame 10, a suction device 20, a hollow support member 30, upper and lower dust collecting bags 50, 60, and a plurality of elongate resilient clamping plates 40. The main frame 10 has a bottom portion mounted with a plurality of rollers 11, and two upright support legs 12 connected to the bottom portion for supporting the suction device 20 in a conventional manner.

The suction device 20 includes a housing 22 mounted on the main frame 10, and formed with a suction inlet 24 and a suction outlet 25, and a motor-driven blade unit 21 mounted on the housing 22, and operable so as to draw dust-laden air into the housing 22 via the suction inlet 24, and so as to discharge the dust-laden air from the housing 22 via the suction outlet 25.

The hollow support member 30 is annular, and has looped outer and inner wall surfaces 33, 34, and upper and lower end parts 31, 32. The inner wall surface 34 confines an air passage 35. The support member 30 is coupled to the suction outlet 25 in a conventional manner so as to communicate fluidly the air passage 35 with the suction outlet 25.

Each of the upper and lower dust collecting bags 50, 60 is made of an air permeable fabric material, and has a mouth portion. The mouth portion of each dust collecting bag 50, 60 is sleeved on the support member 30 so as to surround the outer wall surface 33 of the support member 30 at a respective one of the upper and lower end parts 31, 32 such that an interior of each dust collecting bag 50, 60 is in fluid communication with the air passage 35 in the support member 30. The mouth portion of each dust collecting bag 50, 60 is provided with a known strap unit 70, 80 that is operable so as to tighten the mouth portion on the support member 30 and so as to loosen the mouth portion from the support member 30.

The elongate resilient clamping plates 40 are mounted spacedly on the outer wall surface 33 of the support member 30. Each of the clamping plates 40 includes a mounting segment 41, a clamping segment 42, and a guide segment 43. The mounting segment 41 is mounted securely on the outer wall surface 33 of the support member 30 by means of screws. The clamping segment 42 extends from the mounting segment 41, and cooperates with the outer wall surface 33 of the support member 30 so as to clamp the mouth portion of the lower dust collecting bag 60 therebetween, thereby enabling retention of the mouth portion of the lower bag 60 on the support member 30 when the strap unit 80 is in a loosened state. The guide segment 43 extends inclinedly from the clamping segment 42 in a radial outward direction relative to the support member 30, and guides the mouth portion of the lower dust collecting bag 60 for insertion between the clamping segment 42 and the outer wall surface 33 of the support member 30.

In use, the blade unit 21 is activated to draw dust-laden air into the housing 22 and to discharge the same from the housing 22 into the dust collecting bags 50, 60 via the air passage 35 of the support member 30. The lower bag 60 is removed from the support member 30 for cleaning after using the dust collector 100 for a period of time and after transferring the dust collected in the upper bag 50 into the lower bag 60. After cleaning, the lower bag 60 is then sleeved back on the support member 30 by inserting its mouth portion between the clamping segments 42 of the clamping plates 40 and the outer wall surface 33 of the support member 30 with the assistance of the guide segments 43. Finally, the strap unit 80 is tightened to secure the lower bag 60 on the support member 30. Thus, the dust collector 100 has a dust collecting bag 60 that is easy to install and that can be handled by only one person. The object of the invention is thus met.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A dust collector comprising:

a main frame;

a suction device including a housing mounted on said main frame and formed with a suction inlet and a suction outlet, and a motor-driven blade unit mounted on said housing and operable so as to draw dust-laden air into said housing via said suction inlet and so as to discharge the dust-laden air from said housing via said suction outlet;

a hollow support member having looped outer and inner wall surfaces, said inner wall surface confining an air passage, said support member being coupled to said suction outlet so as to communicate fluidly said air passage with said suction outlet;

a dust collecting bag having a mouth portion to be sleeved on said support member such that said mouth portion surrounds said outer wall surface of said support member and such that an interior of said dust collecting bag is in fluid communication with said air passage in said support member, said mouth portion being provided with a strap unit that is operable so as to tighten said mouth portion on said support member and so as to loosen said mouth portion from said support member; and a plurality of elongate resilient clamping plates mounted spacedly on said outer wall surface of said support member, each of said clamping plates including a mounting segment mounted securely on said outer wall surface of said support member, a clamping segment extending from said mounting segment and cooperating with said outer wall surface of said support member so as to clamp said mouth portion of said dust collecting bag therebetween, thereby enabling retention of said mouth portion on said support member when said strap unit is in a loosened state, and a guide segment extending inclinedly from said clamping segment in a radial outward direction relative to said support member, said guide segment guiding said mouth portion of said dust collecting bag for insertion between said clamping segment and said outer wall surface of said support member.

* * * * *